(12) United States Patent
Liu et al.

(10) Patent No.: US 10,746,857 B2
(45) Date of Patent: Aug. 18, 2020

(54) METHOD FOR CORRECTING MEASURING ERRORS OF LONG-DISTANCE SCANNING LASER RADAR

(71) Applicants: Beijing Aerospace Institute for Metrology and Measurement Technology, Beijing (CN); China Academy of Launch Vehicle Technology, Beijing (CN)

(72) Inventors: Ke Liu, Beijing (CN); Yinxiao Miao, Beijing (CN); Jincheng Song, Beijing (CN); Zengyu Sun, Beijing (CN); Lizhen Guo, Beijing (CN); Hao Zhu, Beijing (CN)

(73) Assignees: Beijing Aerospace Institute for Metrology and Measurement Technology, Beijing (CN); China Academy of Launch Vehicle Technology, Beijing (CN)

( * ) Notice: Subject to any disclaimer, the term of this patent is extended or adjusted under 35 U.S.C. 154(b) by 368 days.

(21) Appl. No.: 15/864,273

(22) Filed: Jan. 8, 2018

(65) Prior Publication Data
US 2018/0196126 A1    Jul. 12, 2018

(30) Foreign Application Priority Data
Jan. 10, 2017    (CN) .......................... 2017 1 0014687

(51) Int. Cl.
G01S 7/497    (2006.01)
G01S 17/42    (2006.01)
G01S 7/48    (2006.01)

(52) U.S. Cl.
CPC ............ *G01S 7/497* (2013.01); *G01S 7/4808* (2013.01); *G01S 17/42* (2013.01)

(58) Field of Classification Search
CPC ........ G01S 7/497; G01S 17/89; G01S 7/4802; G06K 9/0063
See application file for complete search history.

(56) References Cited

U.S. PATENT DOCUMENTS

| | | | | |
|---|---|---|---|---|
| 4,816,833 A | * | 3/1989 | Ferguson | G01S 13/20 342/108 |
| 2005/0062615 A1 | * | 3/2005 | Braeuchle | G01S 13/867 340/903 |
| 2012/0242531 A1 | * | 9/2012 | Itoh | G01S 13/345 342/107 |

* cited by examiner

*Primary Examiner* — Luke D Ratcliffe
(74) *Attorney, Agent, or Firm* — Wayne & Ken, LLC; Tony Hom

(57) ABSTRACT

The present invention relates to a method for correcting measuring errors of a long-distance scanning laser radar, comprising: S1, establishing a measuring model and acquiring a positional relationship between a measured point and a coordinate origin; S2, acquiring an actual positional relationship between the measured point and a laser radar and establishing error models of three major error sources; S3, performing a sub-parameter measuring experiment on the laser radar to acquire major sample data of the three major error sources; S4, analyzing probability density distribution of the three major error sources with a statistical method to obtain error correction samples of the three major error sources in a three-dimensional coordinate system; S5, acquiring three-dimensional coordinate samples according to the error correction samples of the three major error sources and the measuring model; and S6, correcting a three-dimensional coordinate measuring point in real time.

4 Claims, 1 Drawing Sheet

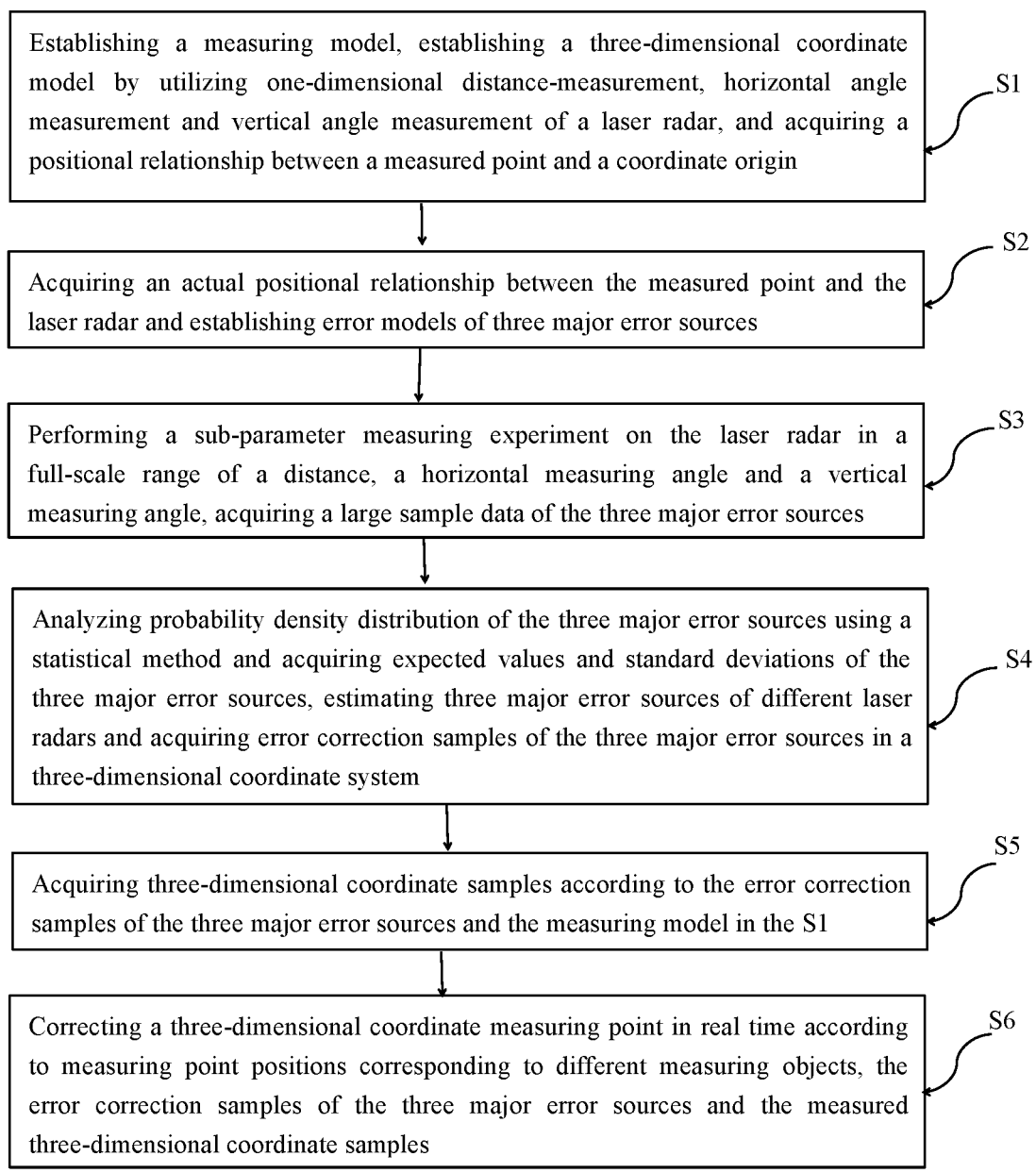

METHOD FOR CORRECTING MEASURING ERRORS OF LONG-DISTANCE SCANNING LASER RADAR

TECHNICAL FIELD

The present invention relates to the technical field of radar measuring, and specifically relates to a method for correcting measuring errors of a long-distance scanning laser radar.

BACKGROUND

A long-distance scanning laser radar is a large-size space coordinate measuring instrument for realizing scanning measuring of cloud data of three-dimensional points on surfaces of large objects in a size range of 100 m–1 km; and the measured data is used as a basis for subsequent reverse reconstruction of a digital model. The long-distance scanning laser radar belongs to a spherical coordinate measuring system and measures three-dimensional coordinates of a target point through one-dimensional laser distance-measuring and angle measuring in a horizontal direction and a vertical direction, wherein a distance-measuring unit can measure a distance within a range of 1 km and acquires point cloud data by scanning in the horizontal direction and the vertical direction. Three-dimensional coordinate measuring precision is an important indicator of a measuring instrument and is one of core parameters which must be defined after an instrument product is developed. Distribution of measuring errors can fully reflect the measuring precision of the instrument. Therefore, acquisition of the distribution of the measuring errors is of great significance to development of products of a long-distance scanning laser radar instrument.

At present, the space coordinate measuring instruments such as a laser tracker, a total station instrument, etc. with measuring principles similar to that of the long-distance scanning laser radar are usually calibrated by a method of combining the laser interferometer with the long guide rail; and the specific method refers to a literature *Calibration Specification for Laser Tracker Three-dimensional Measuring System* (JIF1242-2010). A measuring range of the long-distance scanning laser radar reaches 1 km, but the long guide rail with a corresponding size cannot be manufactured, so the instrument cannot be calibrated by the above method. Since a long-distance laser distance-measuring technology is realized based on a principle of pulsed laser flight time, few researchers propose a method for simulating a distance with time to test the distance-measuring error of a pulsed long-distance laser distance measuring instrument in laboratories at present. However, the three-dimensional coordinate measured by the scanning laser radar is a compound parameter of distance-measuring information and two-dimensional angle measuring information, and the three-dimensional coordinate measuring error of the long-distance scanning laser radar cannot be obtained by the above method.

SUMMARY

(1) Technical Problem to be Solved

The technical problem to be solved in the present invention is that an instrument cannot be calibrated when a long-distance measuring point is measured by a laser radar.

(2) Technical Solution

In order to solve the above technical problem, the present invention provides a method for correcting measuring errors of a long-distance scanning laser radar, comprising the following steps:

S1, establishing a measuring model, establishing a three-dimensional coordinate model by utilizing one-dimensional distance-measuring, horizontal angle measuring and vertical angle measuring of a laser radar, and acquiring a positional relationship between a measured point and a coordinate origin;

S2, acquiring an actual positional relationship between the measured point and the laser radar and establishing error models of three major error sources, wherein the three major error sources are a distance-measuring error, a horizontal angle measuring error and a vertical angle measuring error when the laser radar actually measures a spatial measured point;

S3, performing a sub-parameter measuring experiment on the laser radar in a full-scale range of a distance, a horizontal measuring angle and a vertical measuring angle to acquire major sample data of the three major error sources;

S4, analyzing probability density distribution of the three major error sources with a statistical method and acquiring expected values and standard deviations of the three major error sources, so as to estimate three major error sources of different laser radars and acquire error correction samples of the three major error sources in a three-dimensional coordinate system;

S5, acquiring three-dimensional coordinate samples according to the error correction samples of the three major error sources and the measuring model in the S1; and S6, correcting a three-dimensional coordinate measuring point in real time according to measuring point positions corresponding to different measuring objects, the error correction samples of the three major error sources and the measured three-dimensional coordinate samples.

In the S1, the three-dimensional coordinate of the measured point is set as (X, Y, Z); the distance between the point and the coordinate system origin is L; the corresponding horizontal measuring angle is α; the vertical measuring angle is β; and the following relationship is established:

$$\begin{cases} X = L \cdot \cos\alpha \cdot \sin\beta \\ Y = L \cdot \sin\alpha \cdot \sin\beta \\ Z = L \cdot \cos\beta \end{cases}$$

In the step S2, the three major error models are $$\begin{cases} L' = L + \varepsilon_L \\ \alpha' = \alpha + \varepsilon_\alpha \\ \beta' = \beta + \varepsilon_\beta \end{cases}$$

wherein L' is a distance value of the spatial measured point actually measured by the laser radar; α' is a corresponding horizontal angle value of the spatial measured point actually measured by the laser radar, β' is a corresponding vertical angle value of the spatial measured point actually measured by the laser radar, and $\varepsilon_L$, $\varepsilon_\alpha$ and $\varepsilon_\beta$ respectively refer to the distance-measuring error, the horizontal angle measuring error and the vertical angle measuring error when the laser radar actually measures the spatial measured point.

The S3 comprises:

S31, using a high-precision measuring instrument to acquire the distance, the horizontal measuring angle and the vertical measuring angle of the measured point as reference values, and performing a sub-parameter measuring experiment on the laser radar in the full-scale range of the distance, the horizontal measuring angle and the vertical measuring angle of the laser radar, wherein the accuracy of the high-precision measuring instrument is at least an order of magnitude higher than that of the laser radar; and S32, calculating a difference between pointwise measuring values and the reference values to acquire the major sample data of the three major error sources.

In the S3, when a distance error is acquired, if $0\,m<L\leq50\,m$, a series of displacements are generated by a standard long guide rail, a displacement value is monitored by a dual-frequency laser interferometer to obtain a series of standard distance values relative to a zero position of the guide rail as reference values, a measured value of the distance is acquired by the laser radar, and the difference between the measured value and the reference values is the distance-measuring error; and if $L>50\,m$, a long-distance distance-measuring error of a pulsed laser distance-measuring unit is tested and measured by a method for simulating a standard distance with laser flight time so as to obtain a long-distance laser distance-measuring error.

(3) Beneficial Effects

The above technical solution of the present invention has the following advantages: the present invention provides a method for correcting the measuring errors of the long-distance scanning laser radar, comprising the following steps: S1, establishing the measuring model according to a measuring principle, establishing the three-dimensional coordinate model by utilizing one-dimensional distance measurement, horizontal angle measuring and vertical angle measuring of the laser radar, and acquiring the positional relationship between the measured point and the coordinate origin; S2, acquiring the actual positional relationship between the measured point and the laser radar and establishing the error models of the three major error sources, wherein the three major error sources are the distance-measuring error, the horizontal angle measuring error and the vertical angle measuring error when the laser radar actually measures the spatial measured point; S3, performing a sub-parameter measuring experiment on the laser radar in the full-scale range of the distance, the horizontal measuring angle and the vertical measuring angle to acquire the major sample data of the three major error sources; S4, analyzing the probability density distribution of the three major error sources with the statistical method and acquiring the expected values and the standard deviations of the three major error sources, so as to estimate the three major error sources of different laser radars and acquire the error correction samples of the three major error sources in the three-dimensional coordinate system; S5, acquiring the three-dimensional coordinate samples according to the error correction samples of the three major error sources and the measuring model in the step S1; and S6, correcting the three-dimensional coordinate measuring point in real time according to the measuring point positions corresponding to different measuring objects, the error correction samples of the three major error sources and the measured three-dimensional coordinate samples. The present invention provides a method for correcting distribution of three-dimensional coordinate measuring errors of the long-distance scanning laser radar based on a Monte Carlo method, solves a problem of acquiring distribution characteristics of the measuring errors of such instruments, and corrects the three-dimensional coordinate measuring point in real time through analysis results, thereby improving measuring accuracy of the instrument and evaluating uncertainty of measuring after correction.

Besides the technical problem solved by the present invention, technical features of the formed technical solutions and advantages brought by the technical features of the technical solutions, other technical features of the present invention and the advantages brought by the technical features will be further described with reference to drawings.

BRIEF DESCRIPTION OF THE DRAWINGS

FIG. 1 is a flow chart of a method for correcting measuring errors of a long-distance scanning laser radar provided by embodiments of the present invention.

DETAILED DESCRIPTION OF THE EMBODIMENTS

In order to make purposes, the technical solutions and the advantages of embodiments of the present invention clearer, the technical solutions in the embodiments of the present invention are clearly and completely described below with reference to the drawings in the embodiments of the present invention. Apparently, the described embodiments are some but not all of the embodiments of the present invention. All other embodiments obtained by those ordinary skilled in the art based on the embodiments of the present invention without contributing creative efforts shall fall within a protection scope of the present invention.

In description of the present invention, it should be noted that terms "install", "link" and "connect" should be broadly understood, unless otherwise specified and defined explicitly. For example, connection may refer to fixed connection, detachable connection or integral connection, may refer to mechanical connection or electrical connection, and may refer to direct connection, indirect connection by an inter-medium or internal communication between two elements. Those ordinary skilled in the art can understand specific meanings of the above terms in the present invention based on specific situations.

In addition, in the description of the present invention, unless otherwise specified, "a plurality of pieces", "a plurality of strips" and "a plurality of groups" mean two or more, and "several pieces", "several strips" and "several groups" mean one or more.

As shown in FIG. 1, a method for correcting measuring errors of a long-distance scanning laser radar provided by the embodiments of the present invention comprises the following steps:

S1, establishing a measuring model according to a measuring principle, establishing a three-dimensional coordinate model by utilizing one-dimensional distance measurement, horizontal angle measuring and vertical angle measuring of a laser radar, and acquiring a positional relationship between a measured point and a coordinate origin;

S2, acquiring an actual positional relationship between the measured point and the laser radar and establishing error models of three major error sources, wherein the three major error sources are a distance-measuring error, a horizontal angle measuring error and a vertical angle measuring error when the laser radar actually measures a spatial measured point;

S3, performing a sub-parameter measuring experiment on the laser radar in a full-scale range of a distance, a horizontal measuring angle and a vertical measuring angle, acquiring a large sample data of the three major error sources;

S4, analyzing probability density distribution of the three major error sources using a statistical method and acquiring expected values and standard deviations of the three major error sources, estimating three major error sources of different laser radars and acquiring error correction samples of the three major error sources in a three-dimensional coordinate system;

S5, acquiring three-dimensional coordinate samples according to the error correction samples of the three major error sources and the measuring model in the S1; and S6, correcting a three-dimensional coordinate measuring point in real time according to measuring point positions corresponding to different measuring objects, the error correction samples of the three major error sources and the measured three-dimensional coordinate samples.

Further, in the S1, the three-dimensional coordinate of the measured point is set as (X, Y, Z), the distance between the point and the coordinate system origin is L; the corresponding horizontal measuring angle is α; the vertical measuring angle is β; and the following relationship is established:

$$\begin{cases} X = L \cdot \cos\alpha \cdot \sin\beta \\ Y = L \cdot \sin\alpha \cdot \sin\beta \\ Z = L \cdot \cos\beta \end{cases}.$$

Further, in the S2, the three major error models are:

$$\begin{cases} L' = L + \varepsilon_L \\ \alpha' = \alpha + \varepsilon_\alpha \\ \beta' = \beta + \varepsilon_\beta \end{cases},$$

wherein L' is a distance value of the spatial measured point actually measured by the laser radar; α' is a corresponding horizontal angle value of the spatial measured point actually measured by the laser radar; β' is a corresponding vertical angle value of the spatial measured point actually measured by the laser radar; and $\varepsilon_L$, $\varepsilon_\alpha$ and $\varepsilon_\beta$ respectively refer to the distance-measuring error, the horizontal angle measuring error and the vertical angle measuring error when the laser radar actually measures the spatial measured point.

Further, the S3 comprises:

S31, acquiring the distance, the horizontal measuring angle and the vertical measuring angle of the measured point as reference values using a high-precision measuring instrument, and performing a sub-parameter measuring experiment on the laser radar in the full-scale range of the distance, the horizontal measuring angle and the vertical measuring angle of the laser radar, wherein the accuracy of the high-precision measuring instrument is at least an order of magnitude higher than that of the laser radar; and S32, calculating a difference between pointwise measuring values and the reference values, acquiring the large sample data of the three major error sources.

Further, in the S3, when a distance error is acquired, if 0 m<L≤50 m, a series of displacements are generated by a standard long guide rail, a displacement value is monitored by a dual-frequency laser interferometer to obtain a series of standard distance values relative to a zero position of the guide rail as reference values, a measured value of the distance is acquired by the laser radar, and the difference between the measured value and the reference values is the distance-measuring error; and if L>50 m, a long-distance distance-measuring error of a pulsed laser distance-measuring unit is tested and measured by a method for simulating a standard distance with laser flight time so as to obtain a long-distance laser distance-measuring error.

When the horizontal angle measuring error is acquired, a small 0-level multi-tooth indexing table, a regular polygonal prism and a photoelectric auto-collimator are used as angle standards to measure multi-position angle errors by a direct measuring or full-combination method. The small multi-tooth indexing table needs to be mounted on an azimuth axis (corresponding to the horizontal angle measuring) and a pitch axis (corresponding to the vertical angle measuring) of the laser radar through a tooling. The multi-tooth indexing table rotates forwards to provide a standard angle position. The working surface of the regular polygonal prism and the photoelectric auto-collimator monitor a residual deviation of an angle position after the azimuth axis (or the pitch axis) of the laser radar is reversed at a same angle value, thereby obtaining a series of angle errors.

When a vertical angle error is measured, in order to reduce a deformation influence on an axis system of the pitch axis caused by the weight of the small multi-tooth indexing table and the prism, the laser radar needs to be placed and fixed horizontally. Thus, the pitch axis is in a vertical position; the weight of the multi-tooth indexing table and the prism acts in an axis direction; the axis system has the minimum deformation; and the errors introduced by the standards are also minimal.

In use, the measuring model of the instrument is first established according to the measuring principle of the instrument. In the case of only considering the distance-measuring error and the angle measuring error and not considering environment and other error sources, the distance-measuring error and the angle measuring error in a two-dimensional direction are tested respectively under laboratory conditions. The major sample data of the three major error sources are acquired through a lot of random sampling to analyze an error probability density function of the three major error sources. The measuring errors of the three-dimensional coordinates of the laser radar are fitted according to the measuring model of the instrument and sampling results of the major sample errors of the three major error sources. A probability density function of the measuring errors of the three-dimensional coordinates of the laser radar as well as the expected values and the standard deviations of samples are analyzed.

In conclusion, the method for correcting the measuring errors of the long-distance scanning laser radar provided by the embodiments of the present invention comprises the following steps: S1, establishing the measuring model, establishing the three-dimensional coordinate model by utilizing one-dimensional distance-measurement, horizontal angle measurement and vertical angle measurement of the laser radar, and acquiring the positional relationship between the measured point and the coordinate origin; S2, acquiring the actual positional relationship between the measured point and the laser radar and establishing the error models of the three major error sources, wherein the three major error sources are the distance-measuring error, the horizontal angle measuring error and the vertical angle measuring error when the laser radar actually measures the spatial measured point; S3, performing a sub-parameter measuring experiment on the laser radar in the full-scale range of the distance, the horizontal measuring angle and the vertical measuring angle of the laser radar to acquire the major sample data of the three major error sources; S4, analyzing the probability density distribution of the three major error sources with the statistical method and acquiring the expected values and the standard deviations of the three major error sources, so as to estimate the three major error sources of different laser radars and acquire the error correction samples of the three major error sources in the three-dimensional coordinate system; S5, acquiring the three-dimensional coordinate samples according to the error correction samples of the three major error sources and the measuring model in the S1; and S6, correcting the three-dimensional coordinate measuring point in real time according to the measuring point positions corresponding to different measuring objects, the error correction samples of the three major error sources and the measured three-dimensional coordinate samples. The present invention provides a method for correcting distribution of three-dimensional coordinate measuring errors of the long-distance scanning laser radar based on a Monte Carlo method, solves a problem of acquiring distribution characteristics of the measuring errors of such instruments, and corrects the three-dimensional coordinate measuring point in real time through analysis results, thereby improving measuring accuracy of the instrument and evaluating uncertainty of measuring after correction.

Finally, it should be noted that the above embodiments are only used for illustrating the technical solutions of the present invention, rather than limiting the technical solutions. Although the present invention is described in detail with reference to the above embodiments, those ordinary skilled in the art can understand that they still can modify the technical solutions recorded in the above embodiments or perform equivalent replacement on some technical features of the technical solutions, and these modifications or replacements do not make essence of the corresponding technical solutions depart from the spirit and scope of the technical solutions of the embodiments of the present invention.

What is claimed is:

1. A method for correcting measuring errors of a long-distance scanning laser radar, comprising the following steps:
    S1, establishing a measuring model, establishing a three-dimensional coordinate model by utilizing one-dimensional distance-measuring, horizontal angle measuring and vertical angle measuring of a laser radar, and acquiring a positional relationship between a measured point and a coordinate origin;
    S2, acquiring an actual positional relationship between the measured point and the laser radar and establishing error models of three major error sources; wherein the three major error sources are a distance-measuring error, a horizontal angle measuring error and a vertical angle measuring error when the laser radar actually measures a spatial measured point;
    S3, performing a sub-parameter measuring experiment on the laser radar in a full-scale range of a distance, a horizontal measuring angle and a vertical measuring angle, acquiring a large sample data of the three major error sources, wherein the S3 comprises:
        S31, acquiring the distance, the horizontal measuring angle and the vertical measuring angle of the measured point as reference values using a high-precision measuring instrument, and performing a sub-parameter measuring experiment on the laser radar in the full-scale range of the distance, the horizontal measuring angle and the vertical measuring angle of the laser radar, an accuracy of the high-precision measuring instrument is at least an order of magnitude higher than that of the laser radar; and
        S32, calculating a difference between pointwise measuring values and the reference values, acquiring major sample data of the three major error sources;
    S4, analyzing probability density distribution of the three major error sources using a statistical method and acquiring expected values and standard deviations of the three major error sources, estimating three major error sources of different laser radars and acquiring error correction samples of the three major error sources in a three-dimensional coordinate system;
    S5, acquiring three-dimensional coordinate samples according to the error correction samples of the three major error sources and the measuring model in the S1; and
    S6, correcting a three-dimensional coordinate measuring point in real time according to measuring point positions corresponding to different measuring objects, the error correction samples of the three major error sources and the measured three-dimensional coordinate samples.

2. The method for correcting measuring errors of a long-distance scanning laser radar according to claim 1, wherein in the S1, the three-dimensional coordinate of the measured point is set as (X, Y, Z); the distance between the point and the coordinate system origin is L; the corresponding horizontal measuring angle is $\alpha$; the vertical measuring angle is $\beta$; and the following relationship is established:

$$\begin{cases} X = L \cdot \cos\alpha \cdot \sin\beta \\ Y = L \cdot \sin\alpha \cdot \sin\beta \\ Z = L \cdot \cos\beta \end{cases}.$$

3. The method for correcting measuring errors of a long-distance scanning laser radar according to claim 1, wherein in the S2, the three major error models are:

$$\begin{cases} L' = L + \varepsilon_L \\ \alpha' = \alpha + \varepsilon_\alpha \\ \beta' = \beta + \varepsilon_\beta \end{cases},$$

wherein L' is a distance value of the spatial measured point actually measured by the laser radar; $\alpha'$ is a corresponding horizontal angle value of the spatial measured point actually measured by the laser radar; $\beta'$ is a corresponding vertical angle value of the spatial measured point actually measured by the laser radar; and $\varepsilon_L$, $\varepsilon_\alpha$ and $\varepsilon_\beta$ respectively refer to the distance-measuring error, the horizontal angle measuring error and the vertical angle measuring error when the laser radar actually measures the spatial measured point.

4. The method for correcting measuring errors of a long-distance scanning laser radar according to claim 1, wherein in the S3, when a distance error is acquired, if 0 m<L<50 m, a series of displacements are generated by a standard long guide rail, a displacement value is monitored by a dual-frequency laser interferometer to obtain a series of standard distance values relative to a zero position of the guide rail as reference values, a measured value of the distance is acquired by the laser radar, and the difference between the measured value and the reference values is the distance-measuring error; and if L >50 m, a long-distance distance-measuring error of a pulsed laser distance-measuring unit is tested and measured by a method for simulating a standard distance with laser flight time to obtain a long-distance laser distance-measuring error.

* * * * *